May 4, 1937.  L. W. BLAU ET AL  2,079,103
APPARATUS FOR RECORDING EARTH CURRENT TRANSIENTS
Filed Dec. 28, 1934

Ludwig W. Blau  Inventors
Louis Statham
By W. F. Weisgerber  Attorney

Patented May 4, 1937

2,079,103

UNITED STATES PATENT OFFICE 2,079,103

APPARATUS FOR RECORDING EARTH CURRENT TRANSIENTS

Ludwig W. Blau and Louis Statham, Houston, Tex., assignors to Standard Oil Development Company, a corporation of Delaware Application December 28, 1934, Serial No. 759,510

7 Claims. (Cl. 175—182)

This invention relates to an improved apparatus for determining the presence of valuable minerals, oil and other subterranean deposits.

This invention is an improvement over the invention described in Patent No. 1,911,137 granted May 23, 1933, entitled "Method and apparatus for geophysical exploration".

The invention will be fully understood from the following description read in connection with the accompanying drawing in which latter—

Figure 1:
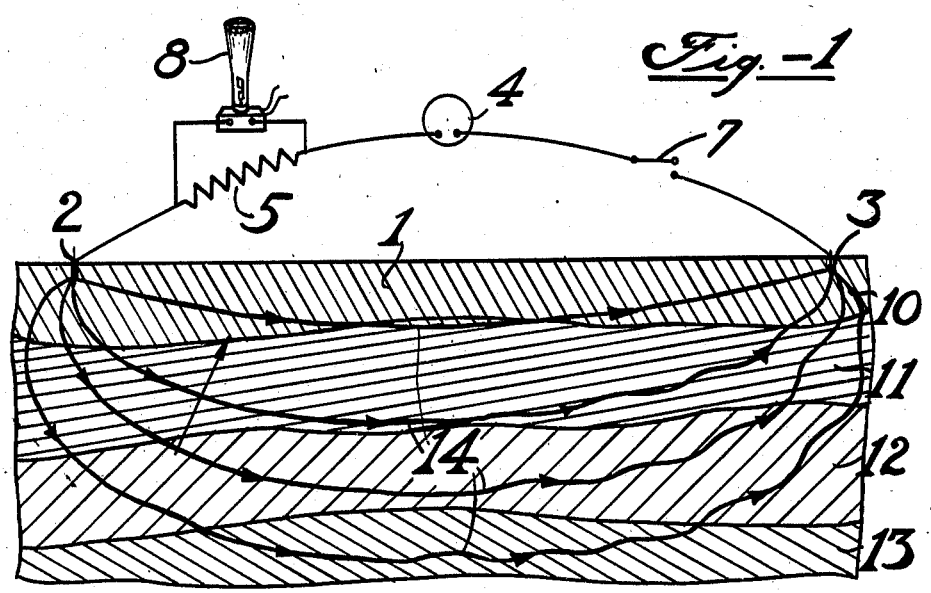
Fig. 1 is a diagrammatic illustration of a preferred apparatus for carrying out the invention.
Figure 2:
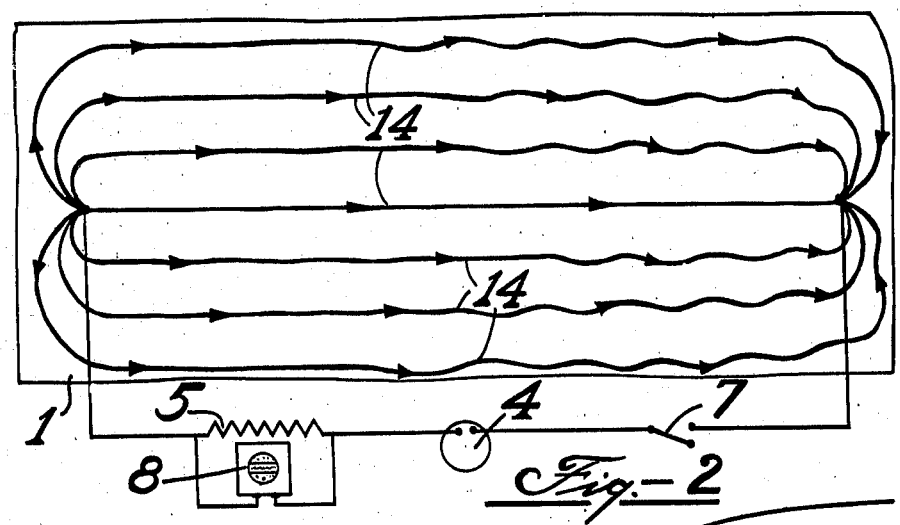
Fig. 2 is a top plan view of the apparatus illustrated in Fig. 1.

Referring to the drawing, reference numeral 1 indicates the surface of the earth. Electrodes 2 and 3 which may be porous cups are embedded in the earth spaced at a substantial distance from each other. An electric circuit connects the electrodes 2 and 3. The electric circuit comprises a battery 4 or other source of direct current which is connected in series with a resistance 5 and a switch 7 to the electrodes 2 and 3. A suitable indicating instrument is arranged in the circuit for receiving an indication of the transient of the current as modified by its passage through the earth. The indicating instrument preferably is a cathode ray oscillograph 8, the deflecting plates of which are connected to the circuit in parallel with the resistance 5. The transient of the current as modified by its passage through the earth is photographed in the usual manner.

For the purposes of this invention, it is immaterial what type of electrodes are used provided, adequate contact is obtained with the earth. Moreover, the distance between the electrodes may be widely varied. In general, however, we prefer to have them about one mile apart. The potential difference may also be varied according to conditions. For most purposes good results can be obtained by using a potential difference of less than 500 volts.

The method of operating the invention will be understood from the following specific example: The electrodes 2 and 3 are set in the earth at a distance of from several hundred feet to a few miles apart and a potential difference up to about 500 volts is applied across them from the source of current 4. When the switch 7 is closed the current passing between the electrodes 2 and 3 builds up gradually depending upon the electrical constants of the earth strata such as designated 10, 11, 12 and 13 through which the electric lines of force designated 14 pass. The varying current from its zero value at the instant of closing the switch to its steady value some time afterwards or any curve representing such current is called a transient. The current is transmitted to the oscillograph 8 connected in parallel with the resistance 5. The oscillograph 8 is operated in the usual manner to give a curve indicating the current or potential, depending on whether the oscillograph is current or voltage sensitive.

Figure 3:
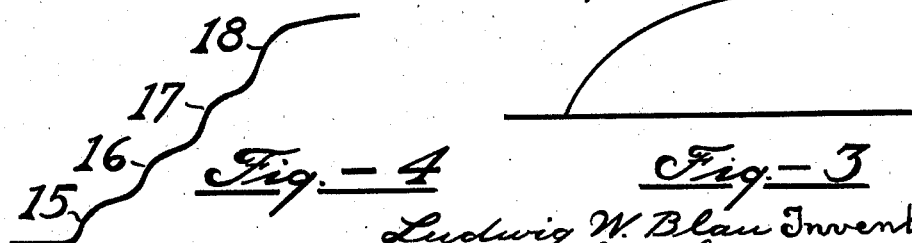

If the earth strata through which the current passes are homogeneous, the transient obtained will increase steadily to a certain constant value, giving an exponential curve as a rule, as shown in Fig. 3.

Figure 4:
Figs. 3 and 4 are diagrams showing typical curves obtained by use of the apparatus of Fig. 1.

If there are layers of different materials having different electrical characteristics in the earth through which the current passes, the transient obtained will show "ripples", as shown in Fig. 4. Each ripple will be similar to the complete transient obtained with a homogeneous medium, but of shorter duration being representative of a certain layer. The number of such ripples recorded will increase as the distance between the electrodes 2 and 3 is increased. It is known that for a single layer supplied with direct current, the current requires for its upbuilding to the steady value a time $$T = \frac{Ah}{R}$$

where A is a constant, $h$ is the depth of the layer, and R is the resistance of the material composing the layer. (See article by Franz Ollendorff in Archiv Fuer Elektro-Technik, vol. 23, No. 3, p. 261–78, 1930). If to the single layer there is added another layer of different resistance, the time of building up due to the first layer will still be about the same, since resistances in the ground are high; however, there will be a modification due to the second layer, which will contribute another transient the operation of which will be proportional to the thickness of the layer. The various ripples thus become identified with certain subterranean strata and the changes in the thickness of any certain layer from one place to another are indicated by its ripples. A ripple of short duration denotes a thin layer while a thick layer causes a long ripple. The duration of each ripple is plotted against the distance on the surface from a point of reference in the same manner as in seismology, where the times of arrival of the seismic waves are plotted against distance. Referring to Fig. 4, a diagram is shown in which the portions of the curve 15, 16, 17 and 18 designate ripples corresponding to those created by the earth layers 10, 11, 12 and 13 respectively.

As the equipment is moved over the region to be tested, a number of records will be obtained showing at each location of test the number of earth strata of different electrical characteristics and the approximate thickness of such strata, affording a convenient means for the correlation of strata from station to station.

We are aware that direct current has heretofore been used for evaluating underground structure by determining regions of equipotential about an electric current passing through the earth. In the present invention, however, a different principle is used. The effect of the transient of the direct current flowing through the earth between electrodes is caused to impart its characteristics as modified by its passage through the earth to a current indicator connected in parallel with a known resistance connected in series with the source of electric energy and the electrodes. This procedure results in a high degree of sensitivity in obtaining an indication of the transient of the current as modified by its passage through a continuous extended volume of the ground.

Various changes may be made within the scope of the appended claims in which it is desired to claim all novelty inherent in the invention as broadly as the prior art permits.

We claim:

1. Apparatus for geophysical exploration, comprising means for passing an electric current through a given volume of the ground, a resistance operatively connected with the means, and a current indicator connected in parallel with the resistance for receiving an indication of the transient of the current as modified by its passage through the ground.

2. Apparatus for geophysical exploration, comprising spaced electrodes in the ground, an electric circuit connecting the electrodes, including a source of electric energy and a resistance connected in series with the electrodes whereby electric current is passed through a volume of the ground including subsurface strata between the electrodes, and an indicator connected in parallel with the resistance for receiving an indication of the transient of the current as modified by its passage through the ground.

3. Apparatus for geophysical exploration, comprising spaced electrodes in the ground, an electric circuit connected to the electrodes, including means for passing a current through the ground between the electrodes, a resistance in the circuit, and an oscillograph connected to the circuit in parallel with the resistance for receiving an indication of the transient of the current as modified by its passage through the ground.

4. A system for geophysical exploration, comprising spaced electrodes in the ground, means for passing electric current through a volume of the ground including subsurface strata between the electrodes from a source of electric energy through a suitable resistance, and means connected in parallel with the resistance for receiving an indication of the transient of the current as modified by its passage through the ground.

5. Apparatus for geophysical exploration, comprising spaced electrodes in the ground, an electric circuit connecting the electrodes, including a source of electric energy whereby electric current is passed through a volume of the ground including subsurface strata between the electrodes, and an indicator in the circuit for receiving an indication of the transient of the current as modified by its passage through the ground.

6. Apparatus for geophysical exploration, comprising means for passing an electric current through a circuit including an extended volume of the ground, and an indicating instrument arranged in the circuit for receiving an indication of the transient of the current as modified by its passage through the ground.

7. Apparatus for geophysical exploration, comprising spaced electrodes in the ground, an electric circuit for passing an electric current into the ground through the electrodes and including a source of electric energy, and means in the circuit for receiving an indication of the transient of the current as modified by its passage through the ground.

LUDWIG W. BLAU.
LOUIS STATHAM.